United States Patent
Chong et al.

(10) Patent No.: US 6,907,430 B2
(45) Date of Patent: Jun. 14, 2005

(54) METHOD AND SYSTEM FOR ASSESSING ATTACKS ON COMPUTER NETWORKS USING BAYESIAN NETWORKS

(75) Inventors: Chee-Yee Chong, Los Altos, CA (US); Lester J. Gong, San Ramon, CA (US); Erich J. Smythe, Reston, VA (US)

(73) Assignee: Booz-Allen Hamilton, Inc., McLean, VA (US)

( * ) Notice: Subject to any disclaimer, the term of this patent is extended or adjusted under 35 U.S.C. 154(b) by 314 days.

(21) Appl. No.: 09/969,722

(22) Filed: Oct. 4, 2001

(65) Prior Publication Data

US 2003/0070003 A1 Apr. 10, 2003

(51) Int. Cl.[7] .............................................. G06F 17/30
(52) U.S. Cl. ........................ 707/100; 713/200; 713/201
(58) Field of Search ................................ 713/152, 164, 713/166, 200, 201; 707/100, 10

(56) References Cited

U.S. PATENT DOCUMENTS

| | | |
|---|---|---|
| 5,122,976 A | 6/1992 | Bellows et al. |
| 5,133,046 A | 7/1992 | Kaplan |
| 5,278,901 A | 1/1994 | Shieh et al. |
| 5,293,323 A | 3/1994 | Doskocil et al. |
| 5,428,619 A | 6/1995 | Schwartz et al. |
| 5,508,941 A | 4/1996 | Leplingard et al. |
| 5,704,017 A | 12/1997 | Heckerman et al. |
| 5,919,257 A | 7/1999 | Trostle |
| 5,970,482 A * | 10/1999 | Pham et al. .................. 706/16 |
| 5,991,881 A | 11/1999 | Conklin et al. |
| 6,076,083 A | 6/2000 | Baker |
| 6,185,689 B1 | 2/2001 | Todd, Sr. et al. |
| 6,253,337 B1 | 6/2001 | Maloney et al. |
| 6,266,773 B1 | 7/2001 | Kisor et al. |
| 6,678,548 B1 * | 1/2004 | Echauz et al. .............. 600/544 |

OTHER PUBLICATIONS

Bayesian Network Repository, document.*
"Combining semijoins and hash–semijoins in a distributed query processing strategy", Morrissey et al. 1999, pp. 122–126.*
"Probabilistic event–driven fault diagnosis through incremental hypothesis updating", Steinder et al.*

* cited by examiner

*Primary Examiner*—Safet Metjahic
*Assistant Examiner*—Haythim Alaubaidi
(74) *Attorney, Agent, or Firm*—Burns, Doane, Swecker & Mathis, L.L.P.

(57) ABSTRACT

A method and system are disclosed for processing data from a computer network to determine an occurrence of and characterize a particular activity associated with the computer network. In accordance with exemplary embodiments of the present invention, a collection of data is managed that corresponds to events associated with the computer network. At least one model is established to correlate an occurrence of a predetermined set of events. At least one hypothesis is formed, using the at least one model, that characterizes the particular activity associated with the computer network. The at least one hypothesis is evaluated using the at least one model. The steps of forming and evaluating are performed interactively with the step of managing to iteratively update the collection of data.

17 Claims, 3 Drawing Sheets

US 6,907,430 B2

Figure 1:
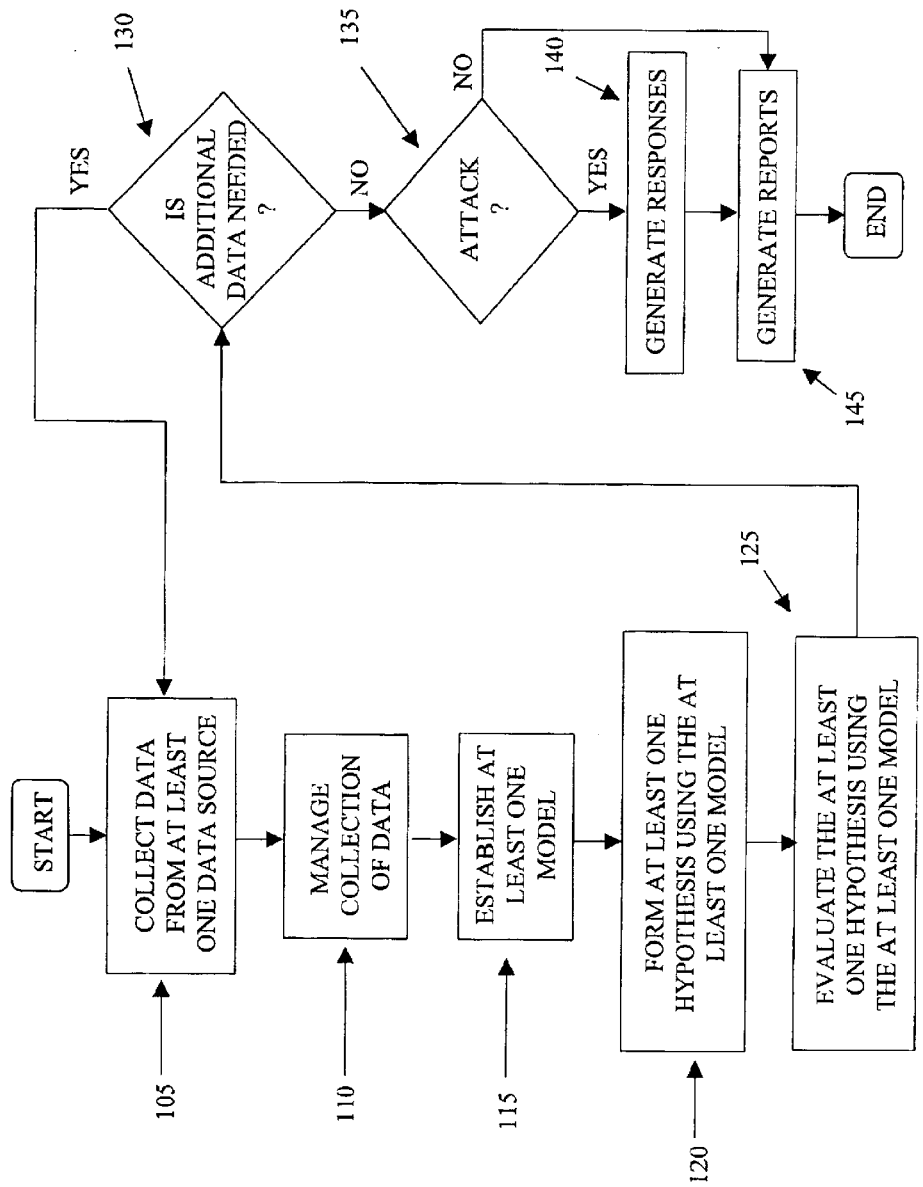

METHOD AND SYSTEM FOR ASSESSING ATTACKS ON COMPUTER NETWORKS USING BAYESIAN NETWORKS

BACKGROUND

1. Field of the Invention

The present invention relates to computer networks. More particularly, the present invention relates to a method and system for assessing activities within a computer network using Bayesian networks to, for example, detect attacks on the computer network, characterize and assess the nature and objectives of the attacks, and assess the vulnerability and security state of the computer network.

2. Background Information

It is known to monitor activity within computer networks. For example, there are computer network security software products for Information Assurance (IA) which focus on Intrusion Detection (ID) and other systems that provide activity logs. These software products range in sophistication from utilities that simply log network activities to intrusion detection systems (IDSs) which capture IA/ID domain expertise in thousands of rules. Responses from these ID products may be, for example, to alert a system administrator, trigger automated system shutdowns or reconfigurations, or cue more intensive data collection. Automated responses against possible computer network attacks are currently limited, false alarm rates are high, and extensive manual intervention is required to assess possible attacks on computer networks.

Research in the area of IA has concentrated on detecting computer network attack activity and determining responses at the system or local network level. Current computer network security software products, such as, for example, the Automated Intrusion Detection Environment (AIDE) developed by the United States Air Force Research Laboratory, perform "low-level" intrusion detection by answering questions such as, for example "Is this activity a port scan?" or "Are these illegal logins?". However, computer network security software products do not characterize the computer network attack. Current IA software products do not perform "high-level" attack assessment by asking questions such as, for example, "What type of attacker are we dealing with?" or "What is the objective of the attacker?" Rather, a system administrator typically looks at the data collected at numerous sites to detect a coordinated attack.

Computer network security devices, such as IDSs, can generate huge amounts of data. Detecting a coordinated attack can become difficult if the system administrator has to digest reports from numerous IDSs at numerous sites. As a consequence, large amounts of data generated by these computer network security devices are frequently not analyzed. Even when detecting attacks on a local network, computer network security software products are often configured to defer "high-level" analysis to the system administrator. Such a process is inefficient and cannot support a real-time attack assessment and response. In addition, the network security analyst needs a capability to fuse the outputs from different computer network security devices to make these high-level assessments about host or network attack activity to generate appropriate responses.

It would be desirable to provide a system and method that provide a high-level assessment of the nature and objectives of attacks on computer networks using outputs from computer network security devices to automatically characterize routine attacks, to reduce the amount of manual intervention required to assess possible attacks on computer networks, to assess the vulnerability and security state of the network, and to allow operators to focus on novel or sophisticated computer attacks.

SUMMARY OF THE INVENTION

A method and system are disclosed for processing data from a computer network to determine an occurrence of and characterize a particular activity associated with the computer network. In accordance with exemplary embodiments of the present invention, a collection of data is managed that corresponds to events associated with the computer network. At least one model is established to correlate an occurrence of a predetermined set of events. At least one hypothesis is formed, using the at least one model, that characterizes the particular activity associated with the computer network. The at least one hypothesis is evaluated using the at least one model. The steps of forming and evaluating are performed interactively with the step of managing to iteratively update the collection of data.

BRIEF DESCRIPTION OF THE DRAWING FIGURES

Figures 2A, 2B:
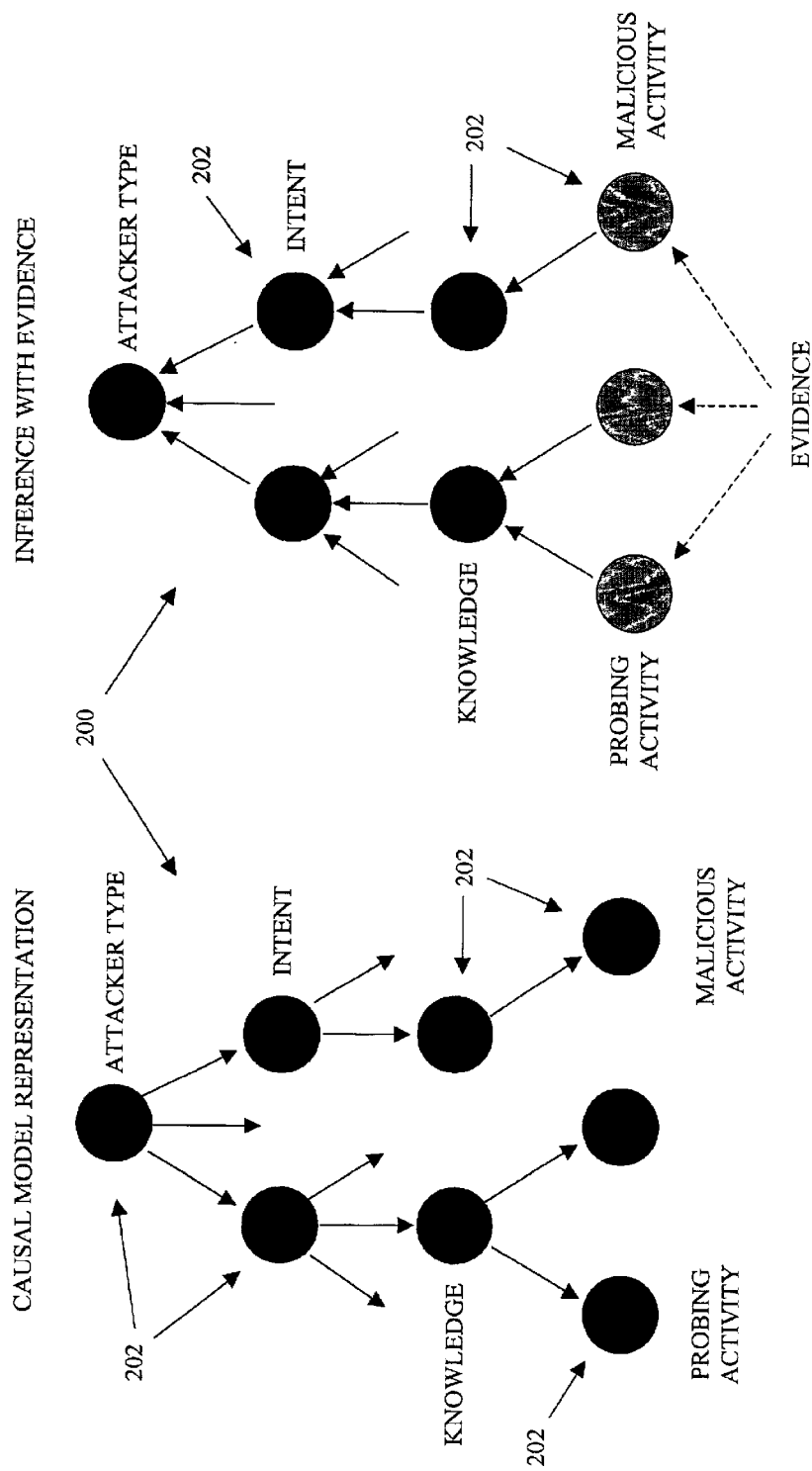
Figure 3:
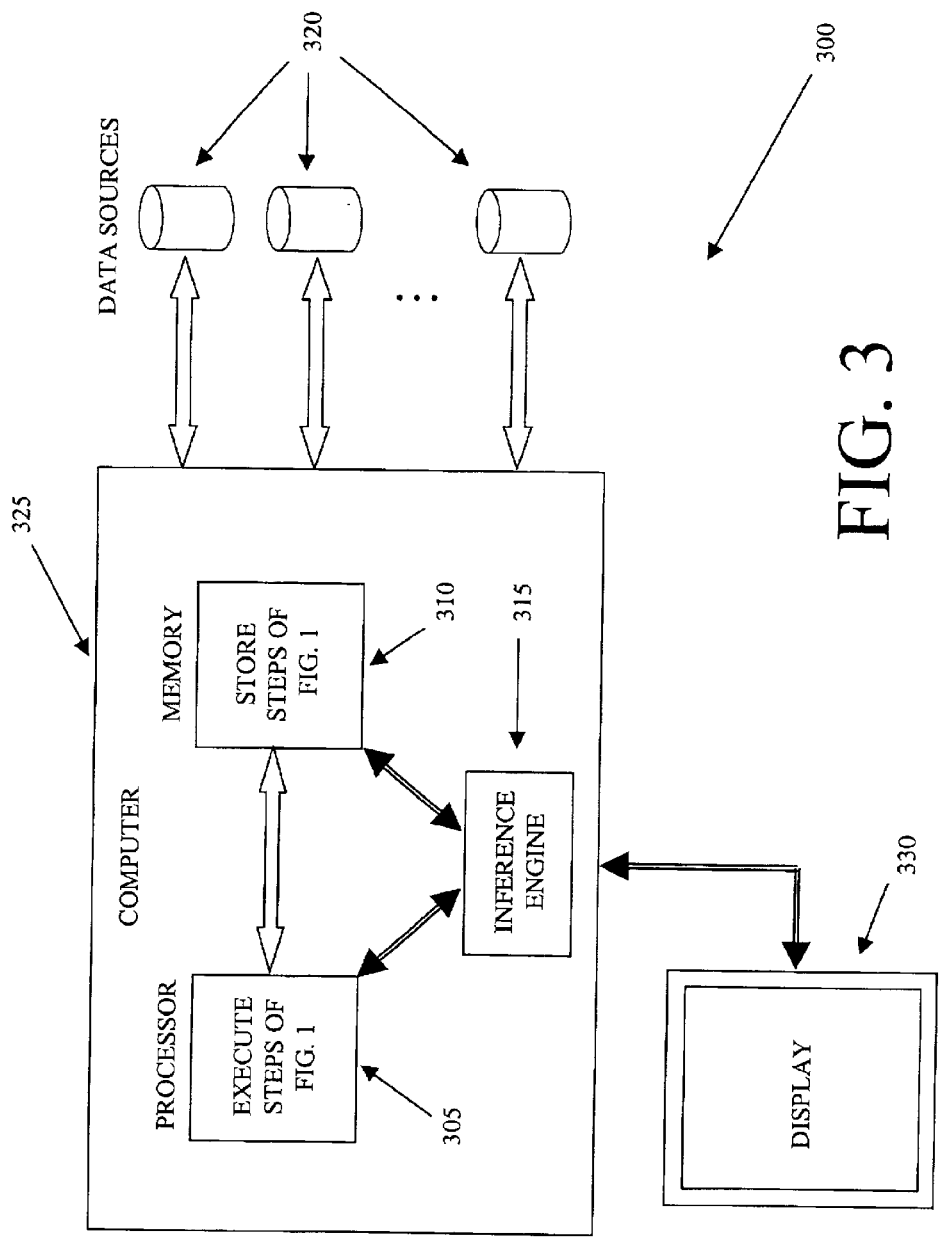

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 1 is a flowchart illustrating the steps carried out for processing data from a computer network to determine an occurrence of and characterize a particular activity as an attack associated with the computer network in accordance with an exemplary embodiment of the present invention;

FIGS. 2A and 2B illustrate causal and inference models representing Bayesian networks in accordance with an exemplary embodiment of the present invention; and FIG. 3 illustrates a system for processing data from a computer network to determine an occurrence of and characterize a particular activity as an attack associated with the computer network in accordance with an exemplary embodiment of the present invention.

DETAILED DESCRIPTION OF THE PREFERRED EMBODIMENTS

FIG. 1 is a flowchart illustrating the steps carried out for processing data from a computer network to determine an occurrence of and characterize a particular activity associated with the computer network in accordance with an exemplary embodiment of the present invention. As used herein, a particular activity associated with a computer network can include any type of event or activity associated with the computer network, including, but not limited to, an attack on the computer network, wherein an attack can include any unwanted intrusion or malicious activity into or on the computer network.

In step 105, information corresponding to events associated with the computer network can be collected from at least one data source to generate a collection of data. According to exemplary embodiments, the at least one data source can include information collected from, for example, intrusion detections systems (IDSs) (e.g., NetRanger™ from Cisco Systems, Inc. and RealSecure™ from Check Point™ Software Technologies Ltd.), computer network system logs, a socket, a file (either internal or external to the computer network), a database (either internal or external to the computer network), out-of-band (qualitative) sources such as intelligence reports and news reports, or any other source of information that provides data on the computer network and activities occurring either internally or externally to the computer network that may be relevant to the characterization and assessment of the nature and objectives of the particular activity associated with the computer network.

In step 110, exemplary embodiments of the present invention manage the collection of data corresponding to events associated with the computer network. To manage the collection of data, exemplary embodiments can connect to or disconnect from a particular data source, retrieve data from each data source, and store data from each data source for retrieval. In addition, to control the flow of data from a particular source, data collection on a particular source can be started and stopped.

Because data coming from different sources can have different formats, the data can be converted to a uniform data format to create, for example, normalized data. The data can be normalized by converting computer network event information, represented by formatted data from external information sources, into a common internal format useable by exemplary embodiments of the present invention. External data can be in many forms, including proprietary formats such as the format of data produced by IDS products such as NetRanger™ from Cisco Systems, Inc. The normalization process is generally one of simple translation. For example, the computer network event information can be examined, basic characteristics of the event can be extracted, such as, for example, time, cardinality, probabilities, location, categorizations, labels, and so forth, and this information can be placed into an internal format that is common to all information sources. The internal format is intended to facilitate data storage and manipulation. The internal format can be any form that supports the translation process and preserves the information needed by the models. The internal format can be in, for example, a fixed field/value structure similar to that used by most IDSs. According to exemplary embodiments, the translation can be performed by software translators that can scan the input data and recreate the data in the internal format.

Additional data processing can also be performed by, for example, categorizing the normalized data to facilitate assessment of the particular activity. The categorization can use, for example, source Internet Protocol (IP) address, destination IP address, time stamp, or any other metric or designation for categorizing the data. The data can also be processed to match the format of the data with that required by the models. Any necessary data processing can be performed on the data, such as, for example, aggregating or averaging the data. Thus, managing the collection of data can include any form of data flow control or data processing to manipulate the data.

In step 115, at least one model can be established to correlate an occurrence of a predetermined set of events. Thus, patterns of network activity can be correlated to profiles or models. For example, the evidence (i.e., information or data) collected from multiple data sources can be combined using a model to provide an assessment of, for example, the nature, type, and objectives of the particular activity associated with the computer network, to predict possible future actions, or to provide any other type of information that characterizes the particular activity associated with a computer network.

According to exemplary embodiments, the at least one model can be represented by a Bayesian network. Computer network attack assessment requires reasoning with uncertainty. Uncertainty is present in the models, because it is not possible to predict exactly the activities for a given computer network attack. Uncertainty is present in the data, because intrusion detection reports and other collected data may contain errors and generate false alarms. Bayesian networks offer a technique that can represent uncertainty and can reason with uncertain data. Bayesian networks are described in, for example, U.S. Pat. Nos. 5,704,017 and 6,076,083, the disclosures of which are hereby incorporated by reference.

A Bayesian network, also referred to as a belief network, is a probabilistic, model-based approach for reasoning with evidence that uses efficient algorithms to perform inference. The Bayesian network approach is used to represent models, such as, for example, attack models, because of the Bayesian network's ability to depict both the structural and quantitative nature of the uncertainty and the existence of powerful inference techniques to infer hypotheses from evidence. As shown in FIGS. 2A and 2B, a Bayesian network 200 can be represented graphically, offering an intuitive display of a model. According to exemplary embodiments, the at least one model can comprise at least one node (e.g., nodes 202), in which at least one probabilistic relationship is assigned to at least one link between nodes of the at least one model, and in which the at least one link represents a causal relationship between the nodes.

Nodes 202 of Bayesian network 200 can represent parameters of interest and can be, for example, hypothesis nodes, evidence nodes, or any type of intermediate state node that can be used in characterizing or assessing the nature and objectives of a particular activity associated with a computer network. According to exemplary embodiments, to characterize and assess the nature and objectives of an attack on a computer network, the parameters of interest represented by nodes 202 of Bayesian network 200 can include, for example: attacker type (e.g., hacker, spy, terrorist, criminal, vandal, normal, etc.); attack objective (e.g., challenge, political gain, financial gain, damage, none, etc.); attack intent (e.g., corruption of information, theft of information, theft of service, denial of service, normal, etc.); attacker location (e.g., inside, outside, etc.); knowledge of system (e.g., deep, shallow, etc.); attack methods (e.g., standard, modified, new, none, etc.); target type (e.g., critical, non-critical, etc.); probing activities (e.g., port scanning, password guessing, Ethernet sniffing, etc.); or any other parameter of interest that can be used in characterizing or assessing the nature and objectives of an attack on a computer network.

A causal model of the problem domain can be created using Bayesian networks, with probabilistic relationships encoded between nodes. In a Bayesian network, links between nodes are causal relationships and have values attached to them describing their probabilistic relationship, such as the probability of the attacker intent given the attacker type (i.e., P(Attacker Intent|Attacker Type)) or the probability of probing activity given knowledge of the computer network (i.e., P(Probing Activity|Knowledge)).

According to exemplary embodiments, the at least one model can be established using at least the collection of data. For example, expert knowledge of collected historical data can be used to establish the models. Thus, the causal model representation shown in FIG. 2A can be constructed from numerous information sources. For example, network administrators and network security experts can supply information on computer network vulnerabilities, different attack methods, different types of attackers, and any other information regarding computer network attacks and attackers. In addition, the causal model representation can be constructed from data, such as, for example, the known and unknown network structure, data retrieved from data mining tools, and any other information regarding the computer network. As shown in FIG. 2A, the causal model can be built top-down from the perspective of the computer network attacker. According to exemplary embodiments, the at least one model can be an attack model that represents an attack associated with the computer network and activities associated with the attack from the perspective of a computer network attacker. However, the at least one model can represent any type of activity, event, condition, state, and so forth that can be associated with a computer network.

A domain expert can create models, such as, for example, attack models, by realizing causal relationships among the parameters of interest in the form of a Bayesian network. For example, "Attack Objective" can be a parameter of interest, as well as any other parameter that can be used to characterize or assess the nature and objectives of a particular activity associated with a computer network. The expert can then list a number of different attack objectives found in Intrusion Detection, such as, for example, "Challenge," "Political Gain," and "Financial Gain." The expert can note that an attacker's intentions are related to "Attack Objective," so the expert can, for example, develop a node for "Attack Intent" with "Denial of Service," "Corruption of Information," and "Disclosure of Information" as some exemplary intentions. The expert can then codify his/her knowledge of the relationship between the two parameters into probabilities relating them. The expert can continue to do this for different types of parameters using various IDS outputs or "out-of-band" information, such as, for example, intelligence indications. The expert can also use historical data to help the expert create the probabilities. The expert may also be restricted by practical issues, such as, for example, the ability to develop meaningful probability tables, the timeliness of data, or limitations on the types of data sources available. By continuing this process of relating parameters in the problem, the expert can build models that incorporate the expert's domain knowledge and understanding of the problem.

Once the causal models are created, the causal models can be used as the inference model of FIG. 2B by introducing evidence from the bottom-up to get hypotheses through inference. Thus, in step 120, using the at least one model, at least one hypothesis can be formed that characterizes the particular activity associated with the computer network. For example, the particular activity can be characterized by the at least one hypothesis as an attack associated with the computer network. Once the at least one hypothesis is formed, in step 125 the at least one hypothesis can be evaluated using the at least one model.

When evidence, either complete or partial, is introduced, Bayesian network 200 infers, from the bottom up, possible hypotheses by matching the predictions of the model for different hypotheses with the evidence. For example, Bayesian network 200 can compute posterior probabilities such as, for example, the probability of the attacker type given the evidence (i.e., P(Attacker Type|Evidence)). According to exemplary embodiments, the introduced evidence can be, for example, the collection of data corresponding to events occurring within the computer network.

As a simplified example of the bottom-up inferencing that can be performed using Bayesian networks and the attack models, suppose that the evidence gathered from a computer network reveals that a probing activity, determined to be password guessing, is occurring within the computer network. Applying this evidence to an attack model (e.g., the inference model of FIG. 2B), the Bayesian network could infer that the attacker's knowledge of the system given the probing activity is, for example, shallow. Using this and some additional information, such as, for example, the source IP address of the probes, the Bayesian network could hypothesize that the attacker's location is outside the computer network, given that the attacker's knowledge of the system is shallow and given the source IP address. From this information, the Bayesian network could hypothesize that the attacker's degree of sophistication is low. From this information and some additional information, such as, for example, the deletion of files, the Bayesian network could reason that the attacker's intent is the corruption of information, given that the attacker's degree of sophistication is low and given that files have been or are being deleted. Given that the attacker's intent is corruption of information and given some additional information, the Bayesian network could hypothesize that the attacker's objective is damage to the computer network. Based on this line of reasoning, the Bayesian network could infer that the attacker type is a vandal, given the total available evidence introduced into the Bayesian network and the results of the intermediate nodes. Those of ordinary skill in the art will recognize that this simplified example is given merely to facilitate an understanding of an exemplary embodiment of the present invention. As will be recognized by those of ordinary skill in the art, the inferences and hypotheses made by the Bayesian network at each stage will depend on the parameters of interest assigned to the nodes of the models, the probabilistic relationships encoded between nodes, and the evidence introduced into the attack model.

Thus, the Bayesian network can compute the posterior probability of the characteristics of a particular activity given the evidence using the evidence and the models. The computation is by means of Bayes' Theorem to generate posterior probabilities, such as, for example, P(Attacker Type|Evidence), from prior conditional probabilities, such as, for example, P(Evidence|Attacker Type). The use of Bayes' Theorem has been implemented in Bayesian network inference engines that are available in commercial products such as, for example, the Netica™ Bayesian network inference engine from Norsys Software Inc. (Vancouver, Canada) and in open source software.

As part of the step of evaluating the at least one hypothesis, the collection of data can be automatically evaluated using the at least one model to generate probabilistic assessments of the at least one hypothesis that characterize the particular activities by matching predictions of the at least one model with the collection of data. According to exemplary embodiments, the models can be used to characterize, for example, the nature, type, and objectives of a computer network attack based on the observable evidence by generating attack assessment hypothesis and probabilities.

In addition, the probabilistic assessments of the at least one hypothesis can be automatically evaluated. If additional data is required to determine whether the occurrence of the particular activity is an attack associated with the computer network, in step 130 requirements can be automatically provided to the step of managing for updating the collection of data in step 105. The additional evidence can be used to confirm or refute a hypothesis. Thus, according to exemplary embodiments, the steps of forming and evaluating can be performed interactively with the step of managing to iteratively update the collection of data. Given the current hypotheses, the models can be used to decide if additional evidence would be most useful, for example, in providing information for future assessment. This feedback can provide requirements to data sources to collect and communicate data to the models.

Results retrieved from the Bayesian network models can, therefore, be used to control the flow of evidence to the network. In a bandwidth constrained system, the evidence sent to the model can be restricted to certain types of evidence, such as, for example, uncommon activities. Consequently, when evidence is retrieved and the results from the models are inconclusive in some respect, additional evidence gathering can be triggered, including evidence that was previously ignored. The new evidence can be entered into the models to achieve more complete results. This takes advantage of the Bayesian network characteristic of handling incomplete evidence sets. When more complete results are obtained, these results can be used to trigger additional responses either internally or externally to the computer network. The choice of appropriate responses to an attack, whether performed manually or automatically, can be configured by the operator.

If additional data is not required, then it can be determined in step 135 whether the particular activity is an attack associated with the computer network. If the particular activity is an attack associated with the computer network, then in step 140 exemplary embodiments of the present invention can automatically generate at least one response to counter the attack. Based on the hypotheses and probabilities, several response options can be generated. The responses can, for example, employ techniques and methods to thwart malicious activity, recover lost data, gather evidence for possible legal action against the unwanted intruder, or any other measure required to combat an unwanted intrusion. The response options can be matched to the hypothesis by considering, for example, the probabilities of different hypotheses and the impact of these different responses on the computer network. Consequently, each of the response options can be evaluated to assess the impact (i.e., cost) of the response on the computer network. Based on the assessed risk, at least one response can be selected that minimizes the amount of damage or cost to the computer network while adequately addressing the computer network attack. Thus, exemplary embodiments of the present invention can provide response options for different hypotheses based on the possible effects of the response options on the computer network.

If it is determined in step 135 that the particular activities are not attacks on the computer network, or after the at least one response is generated in step 140, in step 145 at least the particular activity and the evaluation of the probabilistic assessments can be reported to at least one operator. For example, the information can be displayed to the operator on a display, such as a computer monitor or any other video display device for displaying graphical and/or textual information to a user. Alternatively, the information can be stored in any type of computer memory or other electronic storage media or it can be printed in hardcopy format. In either instance, the information can be later retrieved and reviewed by the operator.

While exemplary embodiments of the present invention can automate routine assessment and response for quick response to computer network attacks, the generated reports can provide guidance and interaction to system operators for unusual situations. Thus, the information can be reported to the operator in any manner and using any type of medium which allows the operator to review, assess and respond to unusual computer network activity and to review the results of automatic responses to routine attacks.

The success of a computer network attack can depend on the vulnerabilities of the computer network and how the attacks will affect computer network security. The basic models can describe the general relationships between, for example, attack characteristics and attack activities. Using the basic models, a high-level assessment can be made of a particular activity associated with a computer network. The basic models can be general in nature and may not take into account information such as, for example, the computer network architecture and changes in the security of the network as it is being attacked. To capture the dependence of the system architecture and an attacker's evolving accessibility to parts of a computer network on the security of the network as a whole, additional models can be used that describe the vulnerability and security state of the computer network.

As used herein, vulnerability is a measure of the susceptibility of a computer network to attack activities. The vulnerability of a computer network can depend on the configuration of the computer network, such as, for example, the placement of a computer, the existence of firewalls, the adherence to policies, the security state of trusted systems, and any other aspect of the computer network which could leave the computer network open to potential attack. For example, the level of penetrability of a firewall set-up influences how likely it is to get through the firewall; the configuration of applications influences how likely an attacker can exploit security holes; and the level of security of a trusted computer influences how likely an attacker can exploit another computer accessible from the trusted computer.

As used herein, security state is the state of compromise that a computer network exhibits. Unlike vulnerability, which can be predominantly static in nature, the security state of a system depends on the actions of an attacker. If, for example, an attacker has root access to a particular computer, that computer is compromised, and that fact has implications on the security of computers in the network that are accessible from the compromised computer.

The vulnerability of a system can be fixed given the system configuration and the safeguards protecting it. These vulnerabilities can influence the basic probabilities in, for example, the attack models. Likewise, the security state of a system can be affected by the type of actions an attacker takes and thereby influence, for example, the attack models. In addition, the security state of one computer can influence the vulnerability of itself and computers connected to it. If, for example, an attacker is successful and is able to progress past security checkpoints in the network, the level of security of any particular system and the level of vulnerability of those systems will change.

Information beyond general domain expertise is needed to develop the vulnerability and security state models. Examples of such information include, for example, the manner in which systems in a specific computer network are interconnected (i.e., the network topology or structure), the level of a computer's relative importance in the network, and any other information regarding the layout and configuration of the network. This information is needed, because the specific "identity" of a computer has significance in its value as an attacker's target, and in its accessibility to other computers. For example, if a particular computer is a trusted agent of a company's "e-commerce" servers, then compromise of the trusted computer has implication on the vulnerability of all "e-commerce" servers within that company.

The vulnerability and security state models can interact with each other and with other models, such as, for example, the attack models. Therefore, for example, the attack models can interact with vulnerability and security state models to provide a comprehensive overview of the computer network attack and the system status. According to exemplary embodiments, the probabilistic assessments can be used to predict at least one of a vulnerability and security state of at least one component in the computer network. In other words, the probabilistic attack assessments can be used by the vulnerability and security state models to predict, for example, the vulnerability and security states of other components in the system. In addition, the vulnerability and security state information can be applied to other models, such as, for example, the attack models.

Thus, the vulnerability of a computer or group of computers can be determined and evaluated using evidence of, for example, network configuration, policy changes, security state of connected computers, and any other information regarding the computer network. Attack evidence for a computer or group of computers can be evaluated and combined with the vulnerability information to obtain at least one hypothesis and the security state of the computer or group of computers. The assessments of the security state of a computer or group of computers can be propagated to the vulnerability models of connected computers.

According to exemplary embodiments of the present invention, the attack, vulnerability, and security state models can be established and used separately. According to an alternate embodiment, the attack, vulnerability and security state models can be interconnected in one model. In either embodiment, at least one of the vulnerability and security state of the at least one component in the computer network can be used to generate the probabilistic assessments of the at least one hypothesis. Thus, the results from vulnerability and security state models can be applied to, for example, the attack models and to each other to update their results. For example, the results of the security state of one computer can be applied to the vulnerability model of a connected computer, because the security state of the first computer can affect the vulnerability of the second computer. According to exemplary embodiments, there can be separate sets of models (e.g., attack, vulnerability, security state) for each computer or logical groups of computers (e.g., e-commerce servers, internet servers). However, a single set of models can be used for all computers or logical group of computers.

A system 300 for processing data from a computer network to determine an occurrence of and characterize a particular activity associated with the computer network in accordance with an exemplary embodiment of the present invention will be described with reference to FIG. 3. System 300 can include at least one data source for supplying data corresponding to events associated with the computer network. According to exemplary embodiments, the at least one data source can include information collected from, for example, intrusion detections systems (IDSs) (e.g., NetRanger™ from Cisco Systems, Inc. and RealSecure™ from Check Point™ Software Technologies Ltd.), computer network system logs, a socket, a file (either internal or external to the computer network), a database (either internal or external to the computer network), out-of-band (qualitative) sources such as intelligence reports and news reports, or any other source of information that provides data on the computer network and activities occurring either internally or externally to the computer network that may be relevant to the characterization and assessment of the nature and objectives of the particular activity associated with the computer network.

According to exemplary embodiments, the steps of a computer program as illustrated in FIG. 1 can be performed using a computer 325, such as, for example, a personal computer or any other computer system. Computer 325 can include a memory 310. Memory 310 can be any computer memory or any other form of electronic storage media that is located either internally or externally to computer 325. Memory 310 can store, for example, the steps of a computer program as illustrated in FIG. 1. As will be appreciated based on the foregoing description, memory 310 can be programmed using conventional techniques known to those having ordinary skill in the art of computer programming to carry out the steps of a computer program as illustrated in FIG. 1 described herein. The actual source code or object code for carrying out the steps of a computer program as illustrated in FIG. 1 can be stored in memory 310.

Memory 310 can store steps of a computer program to manage a collection of the data corresponding to events associated with the computer network, to establish at least one model to correlate an occurrence of a predetermined set of events, to form at least one hypothesis, using the at least one model, that characterizes the particular activity associated with the computer network, and to evaluate the at least one hypothesis using the at least one model, wherein the steps of forming and evaluating are performed interactively with the step of managing to iteratively update the collection of data.

Memory 310 can also store steps of a computer program to automatically evaluate the collection of data using the at least one model to generate probabilistic assessments of the at least one hypothesis that characterize the particular activities by matching predictions of the at least one model with the collection of data. According to exemplary embodiments, the at least one model can be represented by a Bayesian network. A Bayesian network inference engine 315 can be used to generate the probabilistic assessments. Bayesian network inference engine 315 can be, for example, a software library that supplies an application programming interface (API) that can be called to execute the steps of a computer program illustrated in FIG. 1 that performs probabilistic assessment. For example, the Netica™ Bayesian network inference engine from Norsys Software Inc. (Vancouver, Canada) or any other Bayesian network inference engine could be used to perform the Bayesian network analysis.

The at least one model can comprise at least one node, in which at least one probabilistic relationship is assigned to at least one link between nodes of the at least one model, and in which the at least one link represents a causal relationship between the nodes. In addition, the at least one model can be established using at least the collection of data. According to exemplary embodiments, the at least one model can be an attack model that represents an attack associated with the computer network and activities associated with the attack from the perspective of an attacker. However, the at least one model can represent any type of activity, event, condition, state, and so forth that can be associated with a computer network.

Memory 310 can store steps of a computer program to automatically evaluate the probabilistic assessments of the at least one hypothesis, to automatically provide requirements to the step of managing for updating the collection of data if additional data is required to determine whether the occurrence of the particular activity is an attack associated with the computer network, and to automatically generate at least one response to counter the particular activity if the particular activity is an attack associated with the computer network.

Memory 310 can also store steps of a computer program to report, to at least one operator, at least the particular activity and the evaluation of the probabilistic assessments. For example, the information can be displayed to the operator on a display, such as display 330 that is used in conjunction with computer 325. Display 330 can be a computer monitor or any other video display device for displaying graphical and/or textual information to a user. However, the information can be reported to the operator in any manner and using any type of medium which allows the operator to review, assess and respond to unusual computer network activity and to review the results of automatic responses to routine attacks.

In addition, memory 310 can store steps of a computer program to predict at least one of a vulnerability and security state of at least one component in the computer network using the probabilistic assessments. Memory 310 can also store steps of a computer program to use the at least one of the vulnerability and security state of the at least one component in the computer network to generate the probabilistic assessments of the at least one hypothesis.

Computer 325 can also include a processor 305 for accessing memory 310 to execute the steps of a computer program as illustrated in FIG. 1. Processor 305 can be any known processor, such as, for example, a microprocessor. Computer 325 can also be connected to at least one other computer in the computer network using any form of network connection, such as, for example, an Ethernet connection.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for processing data from a computer network to determine an occurrence of and characterize a particular activity associated with the computer network, comprising the steps of:
   managing a collection of data corresponding to events associated with the computer network;
   establishing at least one model to correlate an occurrence of a predetermined set of events;
   forming at least one hypothesis, using the at least one model, that characterizes the particular activity associated with the computer network; and
   evaluating the at least one hypothesis using the at least one model, wherein the steps of forming and evaluating are performed interactively with the step of managing to iteratively update the collection of data, wherein the step of evaluating comprises the steps of:
   automatically evaluating the collection of data using the at least one model to generate probabilistic assessments of the at least one hypothesis that characterize the particular activities by matching predictions of the at least one model with the collection of data; and
   automatically evaluating the probabilistic assessments of the at least one hypothesis;
   automatically providing requirements to the step of managing for updating the collection of data if additional data is required to determine whether the occurrence of the particular activity is an attack associated with the computer network;
   automatically generating at least one response to counter the particular activity if the particular activity is an attack associated with the computer network.

2. The method of claim 1, wherein the particular activity is an attack associated with the computer network.

3. The method of claim 1, wherein the step of managing comprises the step of:
   collecting, from at least one data source, information corresponding to events occurring within the computer network to generate the collection of data.

4. The method of claim 1, wherein the at least one model is represented by a Bayesian network.

5. The method of claim 1, wherein the at least one model is established using at least the collection of data.

6. The method of claim 1, wherein the at least one model comprises:
   at least one node, wherein at least one probabilistic relationship is assigned to at least one link between nodes of the at least one model, and wherein the at least one link represents a causal relationship between the nodes.

7. The method of claim 1, wherein the step of evaluating comprises the step of:
   reporting, to at least one operator, at least the particular activity and the evaluation of the probabilistic assessments.

8. The method of claim 1, wherein the step of evaluating comprises the step of:
   predicting at least one of a vulnerability and security state of at least one component in the computer network using the probabilistic assessments.

9. The method claim 8, wherein the step of evaluating comprises the step of:
   using the at least one of the vulnerability and security state of the at least one component in the computer network to generate the probabilistic assessments of the at least one hypothesis.

10. A system for processing data from a computer network to determine an occurrence of and characterize a particular activity associated with the computer network, comprising:
    at least one data source for supplying data corresponding to events associated with the computer network;
    a memory that stores steps of a computer program to:
    manage a collection of data corresponding to events associated with the computer network,
    establish at least one model to correlate an occurrence of a predetermined set of events,
    form at least one hypothesis, using the at least one model, that characterizes the particular activity associated with the computer network;
    evaluate the at least one hypothesis using the at least one model, wherein the steps of forming and evaluating are performed interactively with the step of managing to iteratively update the collection of data;
    automatically evaluate the collection of data using the at least one model to generate probabilistic assessments of the at least one hypothesis that characterize the particular activities by matching predictions of the at least one model with the collection of data;
    automatically evaluate the probabilistic assessments of the at least one hypothesis;
    automatically provide requirements to the step of managing for updating the collection of data if additional data is required to determine whether the occurrence of the particular activity is an attack associated with the computer network; and automatically generate at least one response to counter the particular activity if the particular activity is an attack associated with the computer network; and a processor for accessing the memory to execute the computer program.

11. The system of claim 10, wherein the particular activity is an attack associated with the computer network.

12. The system of claim 10, wherein the at least one model is represented by a Bayesian network.

13. The system of claim 10, wherein the at least one model is established using at least the collection of data.

14. The system of claim 10, wherein the at least one model comprises:

at least one node, wherein at least one probabilistic relationship is assigned to at least one link between nodes of the at least one model, and wherein the at least one link represents a causal relationship between the nodes.

15. The system of claim 10, wherein the memory stores steps of a computer program to:

report, to at least one operator, at least the particular activity and the evaluation of the probabilistic assessments.

16. The system of claim 15, wherein the memory stores steps of a computer program to:

predict at least one of a vulnerability and security state of at least one component in the computer network using the probabilistic assessments.

17. The system of claim 16, wherein the memory stores steps of a computer program to:

use the at least one of the vulnerability and security state of the at least one component in the computer network to generate the probabilistic assessments of the at least one hypothesis.

* * * * *